UNITED STATES PATENT OFFICE.

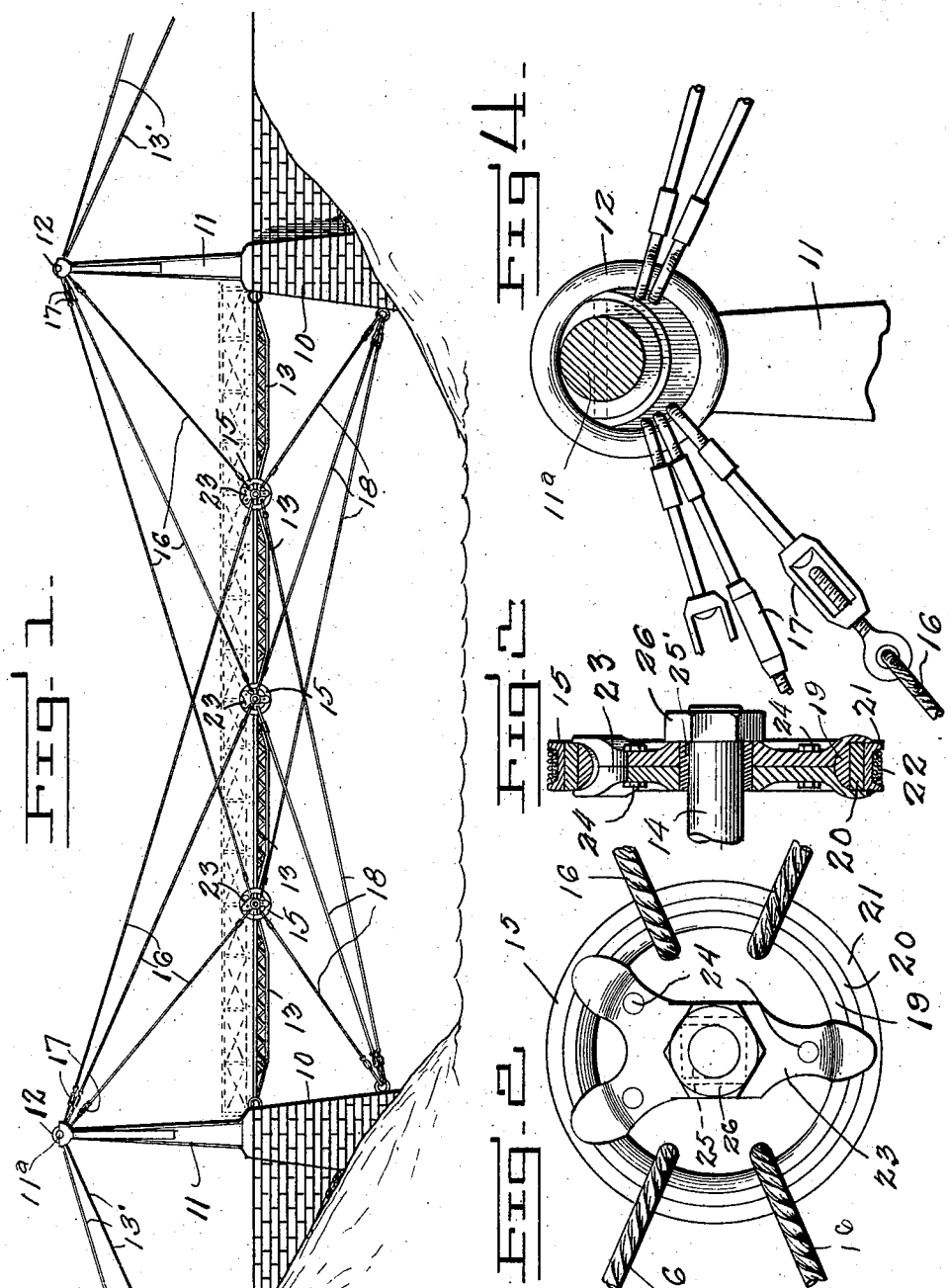

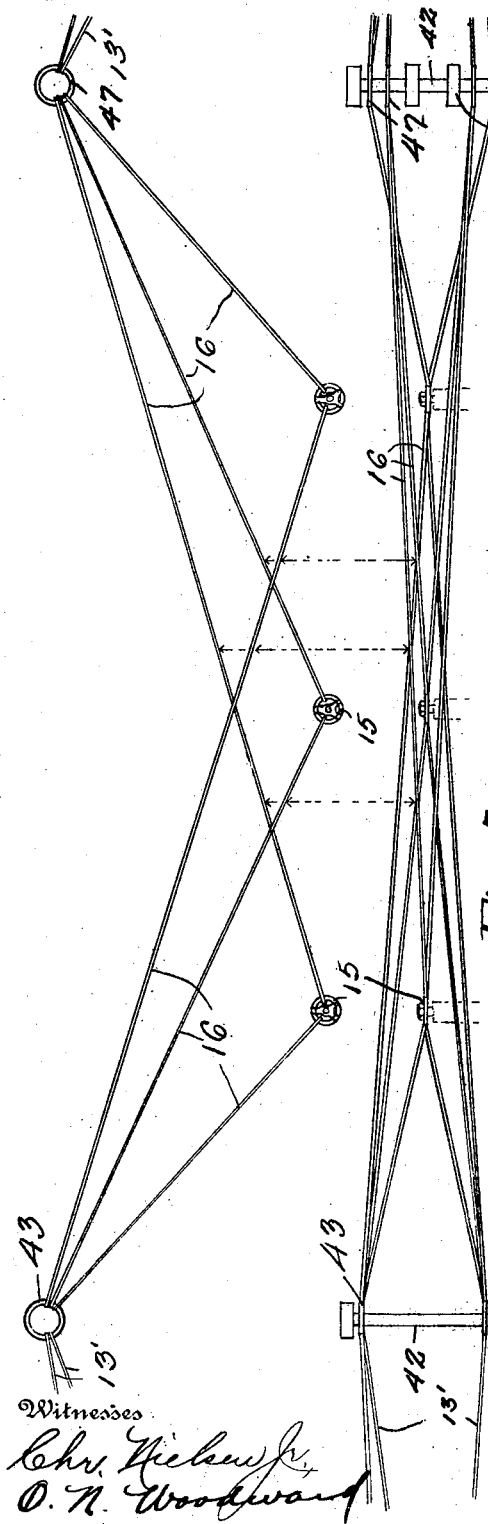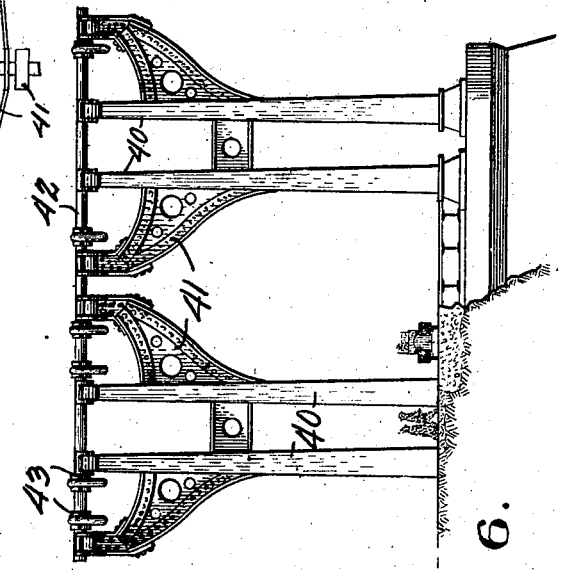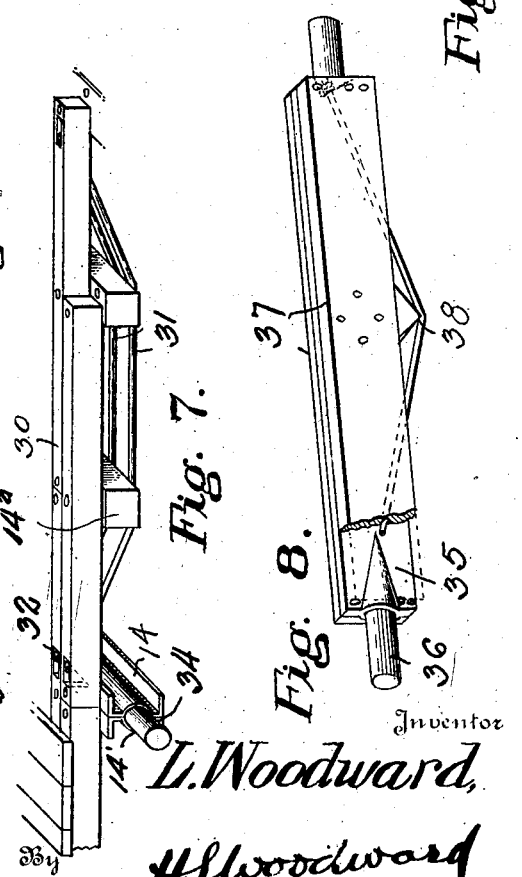

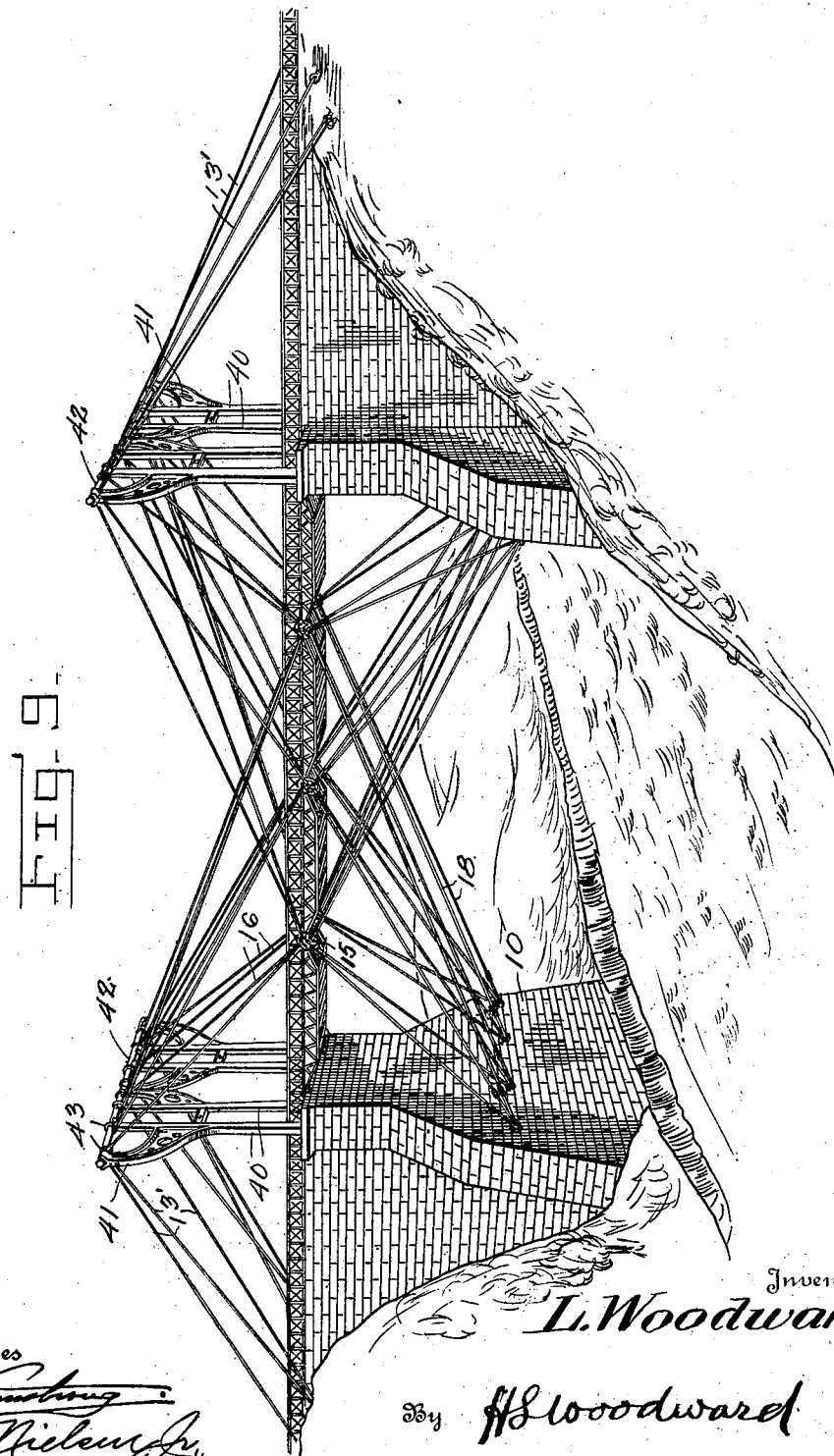

LAVATER WOODWARD, OF LIBERTY, TENNESSEE, ASSIGNOR OF ONE-SIXTH TO BEN F. ODON, ONE-SIXTH TO THOMAS G. SQUIRES, AND ONE-SIXTH TO DAVIS C. BRATTEN, ALL OF LIBERTY, TENNESSEE.

SUSPENSION-BRIDGE.

1,235,627.   Specification of Letters Patent.   Patented Aug. 7, 1917.

Application filed January 28, 1916. Serial No. 74,783.

*To all whom it may concern:*

Be it known that I, LAVATER WOODWARD, a citizen of the United States, residing at Liberty, in the county of Dekalb and State of Tennessee, have invented certain new and useful Improvements in Suspension-Bridges, of which the following is a specification.

The invention has for an object to effect an improvement in the building of suspension bridges whereby the damage resulting from oscillation vertically and by vibration will be greatly reduced. It is also an important object to simplify and cheapen the construction of such bridges particularly in the details whereby the supporting cables are connected to the bridge structure, and in certain details of the bridge structure by which the weight is sustained by the connections.

It is also an important object to enable the use of a multiplicity of suspension cables connected to points alined longitudinally of the bridge without contact between cables from opposite ends of the bridge, thus obviating abrasion and wear of the strands in such contact and relative movement under the effect of vibration, or wind.

Additional objects, advantages, and features of invention will appear from the construction, arrangement and combination of parts hereinafter set forth and illustrated in the drawings, where Figure 1 is an elevation of a small bridge constructed in accordance with my invention, Fig. 2 is a detail of the cable connections, Fig. 3 is a cross sectional detail thereof, Fig. 4 is a detail of the tower structure, Fig. 5 is a diagrammatic plan elevation of the cable system at one side of the bridge indicating the relation of the cables at the points where two adjacent cables intersect a horizontal plane in the same transverse line or where they intersect the same vertical plane, Fig. 6 is an elevational detail of tower construction suitable for a large bridge constructed in accordance with my invention, Fig. 7 is a detail of floor construction such as might be used on a small bridge, but involving principles which may be applied in construction of larger bridges, Fig. 8 is a detail of a cross beam which may be employed, Fig. 9 is a perspective view of a large bridge constructed in accordance with the showing in Figs. 5 and 6, utilizing also principles involved in the details of other views.

There is illustrated a bridge including abutments 10 of the cutomary masonry or other construction for supporting towers 11 over which cables may be passed for supporting the bridge, and which may themselves carry a portion of the roadway, as will be understood. The towers also may be of any familiar construction and at the upper ends carry heavy cross bars $11^a$ around which rings 12 are loosely engaged, in vertical planes parallel to the directions of the bridge, these rings having anchor cables 13' connected thereto and extending to suitable anchorages not shown.

The bridge proper consists of a series of girders 13 in parallel pairs, the outermost two at each end having their outer ends rested on the respective abutments while abutting ends of each two adjacent girders are carried commonly on transverse beams 14 disposed intermediately of the junctions of the girders. The beams include trunnions 14' at the ends as shown, and may comprise shafts circular in cross section throughout their length.

In Figs. 7 and 8 there are shown details of floor and cross beams in construction, Fig. 7 illustrating a construction in which a wooden floor is to be employed supported by wooden stringers 30, the stringers being built up of suitable timbers arranged to break joint, and intermediately of the cross beams 14 suitable cross pieces $14^a$ may be provided, supported by truss rods 31, engaged in the stringers in the customary fashion indicated at 32. In this figure the cross beam is illustrated as formed of two rolled steel beam elements somewhat similar to the ordinary channel irons so called, each beam comprising two rolled elements adjusted back to back, the central portions of each being provided with opposed longitudinal semi-circular recesses, the parts being brought together upon a steel shaft 34, longer than the beam element proper, so that it projects therefrom to provide the trunnion 14'. The rolled beam elements may be riveted or otherwise secured together upon the shaft. As will be understood, the shaft need not extend the full length of the beam, and two shaft sections may be inserted at each end of the beam, it being unnecessary to illustrate this detail, as being one obvious and not involving any substantial departure from what is shown.

In Fig. 8 the beam comprises a built up steel and wood element, including a central cast or otherwise formed plate 35, slightly enlarged intermediately at each end, and provided with trunnion pieces 36 which may be formed integrally therewith, or may constitute a separate piece inserted. To each side of this plate there is bolted a heavy timber 37, and the whole may be trussed as at 38, if desired.

Engaged on the trunnions 14' there are supporting rings 15 to which are so attached at their upper parts suspension cables 16 which are so attached to the rings as to extend, at their points of attachment, in approximately radial lines from the rings. The cables may be connected to the rings 15 in any well known manner, and are extended to the tops of the towers where they are also attached to the rings 12. Turn buckles 17 are preferably interposed between the cables and rings at one end of the cable.

From each ring 15 a cable is extended to each tower, the cables being held as taut as possible, and in this way each beam 14 will be independently supported and will not tend to be raised by weight on other parts of the bridge as would be the case in the ordinary suspension bridge where a plurality of vertical cables are dropped from a single suspension cable at longitudinally spaced points.

In case suspension cables are attached to the bridge intermediately of the length of rigid beams or other elements, as involved in Fig. 7, which nevertheless might flex or vibrate vertically between points of support, in order to limit such flexure and vibration at points distant from the load, I attach cables 18 to the rings 15 extending downwardly to the respective adjacent abutments, there being only one of these cables from each ring except the central one, in Fig. 1, and from the latter one cable 18 is extended to each abutment. Under the effect of these cables downward pressure on one part of the bridge cannot cause upward movement of the other parts, thus greatly lessening vibratory and other movements which ordinarily endanger bridges and cause rapid deterioration.

The rings mentioned require to be very carefully formed in order to sustain the severe stresses to which they will be subjected, and in order to obviate making them excessively large and heavy which would militate against their utility, I build them up in such a manner that they can be made very small in cross sectional measurements, as shown in Fig. 3. Each comprises an inner section 19 rounded on the inside and cylindrical on the outside, so as to be semicircular in cross section, and shrunk on this there is a plain band 20 requiring less tensile strength and preferably very hard, to impart rigidity to the ring, while over this in turn there is shrunk a channeled ring 21, serving to hold a wrapping of high grade steel wire 22, as shown. The inner ring section, and the outer with its wrapping of wire, serve to sustain the tensile strains incident to stresses tending to distort the ring, while the middle section imparts rigidity of form to the ring and is supported by the other two in such a manner as to minimize its liability to fracture.

In order to readily mount the rings on the beams 14, I provide for each ring a yoke or spider 23 consisting of two parts, each having three arms with extremities shaped to fit partly around the ring at one side. These are introduced on to the ring from opposite sides and bolted together as at 24, so that the ring is clamped therebetween. The number of arms may be larger or smaller, as found desirable. They serve to support the ring against collapse, the cables being connected to the ring at the sides, and the arms of the yoke being disposed in the wider spaces between the points of engagement of the cables.

The spider is formed with a rectangular opening 25 therethrough which receives the end of the beam 14 loosely, and a slide bearing 25' may be employed, in order to minimize wear. In the present instance the bearing 25' comprises blocks small enough to move laterally in the opening 25. This permits movement of the trunnions in the rings under contraction and expansion without undue strain on the cables therefrom. A large nut 26 is engaged on the extremity of the beam 14 after insertion through the ring, by which it is held against disengagement from the beam.

In Figs. 5, 6, and 9 there are illustrated details involved in the connection with the erection of large bridges, although they may of course be employed in smaller bridges if desired. In this case the towers 40 have lateral arms 41, aiding in the support of the heavy cross shaft 42 at the top of the towers, and the rings 43 corresponding to the ring 12 before described are similarly engaged around the shaft. In order that the suspension cables from opposite ends of the bridge shall not lie against each other, the rings on the shaft 44 at one end of the bridge are so positioned that the cables therefrom will not pass in contact with those from the other end of the bridge, in accordance with the diagrammatic showing in Fig. 5 which represents the arrangement of the upper cables at one side of the bridge shown in Fig. 1. In this case the cables from the left hand end are run from two sets of rings spaced on opposite sides of the plane in which the rings 15 of the bridge are located, while the cables from the opposite or right hand end are run from rings 47 spaced nearer the plane of the ring 15, so that these cables will pass inwardly of those from the opposite end of the bridge, and clear them. Since the outermost suspension cables at each end of the bridge do not pass close to any other cables, it is unnecessary for these to be run from the inwardly spaced rings and they may run to rings spaced similarly to those at the opposite end of the bridge, as first mentioned, regardless of what spacing is required for the rings carrying suspension cables running to intermediate points on the bridge. In this construction it will be noted that two cables are extended from each ring in each direction, divergently in a plane passing through the cross shaft 42 so that any lateral swinging of the bridge is largely overcome by this method of suspension, in addition to the increased supporting strength obtained. The same is true of the cables 48 extended from the lower sides of the bridge to the respective abutments, so that an unusually rigid bridge is provided, largely free of vibration or lateral movement.

What is claimed:

1. In a bridge of the type described, a cable connection comprising a ring adapted to have a plurality of radiating cables connected thereto, a spider element within the ring, and a bridge supporting element revoluble in the spider.

2. A bridge structural element comprising an annulus, a spider in two parts having arms shaped to partly encircle the annulus transversely to its major plane, for clamping engagement thereon when opposed thereon, means to secure the spider parts in clamped relation, said spider being shaped for supporting connection with a bridge body.

3. A ring for the purposes described comprising a plurality of sections in intimate concentric relation, the outer being peripherally grooved, and a wire wrapping in the groove.

In testimony whereof I have affixed my signature in presence of two witnesses.

LAVATER WOODWARD.

Witnesses:
W. L. VICK,
J. B. ESTES.

Copies of this patent may be obtained for five cents each, by addressing the "Commissioner of Patents, Washington, D. C."